United States Patent Office 3,383,956
Patented May 21, 1968

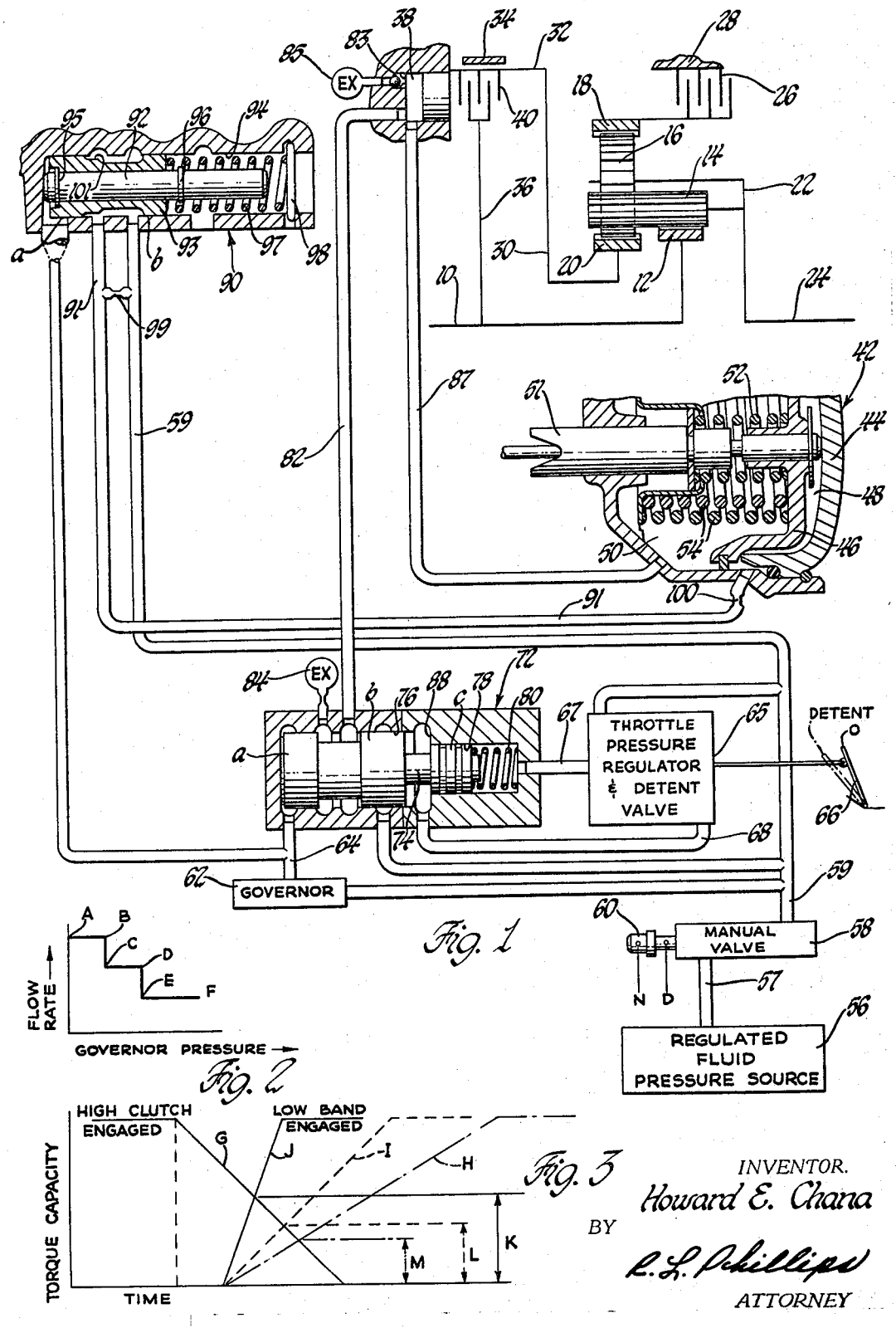

3,383,956
MULTISPEED RESPONSIVE FLOW CONTROL VALVE FOR AUTOMATIC TRANSMISSION CONTROL SYSTEM
Howard E. Chana, Flint, Mich., assignor to General Motors Corporation, Detroit, Mich., a corporation of Delaware
Filed Feb. 16, 1966, Ser. No. 527,908
13 Claims. (Cl. 74—868)

ABSTRACT OF THE DISCLOSURE

A flow control valve conditioned in response to a speed signal establishes three different flow rates with each establishment maintained throughout a predetermined and different speed range. The flow control valve used in an automatic transmission control system controls the connection to a friction drive establishing servo on a downshift to time the drive establishment with three different flow rates dependent upon governor pressure.

This invention relates to flow control valves and more particularly to speed responsive flow control valves for use in transmission control systems.

In vehicular automatic transmissions having a speed and torque responsive shift valve for shifting speed ratios, it is desirable that the rate of low speed drive engagement be timed to high speed drive disengagement to provide smooth downshifts, particularly forced downshifts. If the low speed drive engagement is late, the engine will momentarily run away and if the low speed drive engagement is early, a hitch may result on the downshift. So called high speed downshift timing valves responsive to a speed indicating pressure have been employed to switch the flow to the low speed servo from a fast flow rate in a low speed range to a slow flow rate in a high speed range. While the flow control valves of the prior art having two step flow control have proven generally satisfactory, they often do not meet optimum smooth downshifting standards through the entire speed range.

The flow control valve of this invention controls the connection between a regulated fluid pressure source and the friction drive establishing servo to be timed for three different flow rates dependent on governor pressure. The valve is of the spool type having a spool valve element reciprocally mounted on a movable central pin and limited to the extent of axial movement by stop rings located on the pin and abuttable with the valve element. The valve element is mounted in a bore and has one end together with a pin end in communication with a governor pressure indicating vehicle speed and the other end engaged by a spring. The valve controls the admission of fluid to the servo apply line and in a first valve position, with governor pressure in a low range, establishes unrestricted communication between the fluid pressure source and the servo apply line. The unrestricted valve connection bypasses a small orifice directly connecting the source and servo apply line so that a large orifice in the servo apply line downstream of the small orifice determines a fast flow rate for fast servo apply. When governor pressure increases to an intermediate range, the pin and spool valve element are conjointly moved to a second position bottoming out the pin. In the second valve position the valve element restricts the fluid flow to provide an orifice in parallel with the small orifice and in series with the large orifice which orifices together determine an intermediate servo apply rate. The spool valve when acted on by governor pressure in a high governor pressure range is moved to a third valve position to block the fluid flow through the valve to the servo apply line so that the upstream small orifice and downstream large orifice acting in a series determine a slow servo apply rate.

An object of this invention is to provide a pressure responsive flow control valve having different pressure responsive areas for determining different flow rates.

Another object of this invention is to provide a flow control valve in an automatic transmission control system for controlling the connection between a source of fluid pressure and a servo apply line to supply fluid at a fast flow rate determined by a spring bias and a large speed signal pressure responsive area, an intermediate flow rate determined by a higher signal pressure acting on the large pressure responsive area and a slow flow rate determined by a still higher signal pressure acting on a small pressure responsive area.

These and other objects of the invention will be more apparent from the following specification and drawing in which:

FIGURE 1 diagrammatically shows a transmission gearing arrangement with a transmission control system having the flow control valve incorporating the features of this invention.

FIGURE 2 graphically shows the flow control valve's general characteristics.

FIGURE 3 graphically shows the general downshift characteristics.

TRANSMISSION GEARING ARRANGEMENT

The transmission gearing arrangement shown in FIGURE 1 has an input shaft 10 connected to drive a sun gear 12. Sun gear 12 meshes with a long pinion 14 in mesh with a short pinion 16, pinion 16 being in mesh with a controlled ring gear 18 and a controlled sun gear 20. The long pinion 14 and the short pinion 16 are mounted on the pinion shafts of a carrier 22 connected to drive an output shaft 24. The ring gear 18 is connected to be retarded by a friction plate brake 26 mounted on transmission housing 28, the brake 26 being operated by a fluid servo, not shown, to provide reverse drive. The sun gear 20 is connected by hub 30 to a drum 32 which may be retarded by a band brake 34 to provide a low, forward speed drive. When fluid pressure is supplied to a high servo 38 retained in drum 32 to engage friction clutch plates 40 located between drum 32 and a hub 36 connected to input shaft 10, hub 36 drives drum 32 to cause the sun gear 20 to rotate with shaft 10 for a high, forward speed drive (direct drive) in the gear set.

The low band 34 is engaged by a low servo 42 having a housing 44 which is divided by a piston 46 into an apply chamber 48 and a release chamber 50. The piston 46 is mounted on a piston rod 51 for limited axial movement and the spring 52 lightly cushions the transfer of the apply force from the piston to the piston rod during initial piston movement while the springs 54 control the rate of apply during band engagement and provide a release force. Movement of the piston and piston rod to the left, as viewed in FIGURE 1, will engage band 34 through conventional linkage not shown.

CONTROL SYSTEM

Fluid supply

A regulated fluid pressure source generally denoted at 56, which may be provided by a conventional input driven pump having a sump collecting the control system's exhausts and regulated by a conventional regulator valve, supplies a main line 57.

Manual valve

A manual valve 58 controls the connection between main line 57 and a drive line 59 and has a valve element 60 which in a Neutral position (N) blocks main line 57 and connects drive line 59 to exhaust and in a Drive position (D) connects main line 57 to drive line 59 and closes the exhaust. Drive line 59 is always connected to low servo apply chamber 48 as explained in detail later.

The connection at the manual valve for delivering main line pressure to operate the reverse brake 26 is not shown since it is not necessary for demonstrating the features of the invention.

Governor

A conventional governor 62 is supplied with fluid by the drive line 59. Governor 62 is driven at a speed proportional to the speed of the driven shaft 24 to provide in a governor line 64 a pressure proportional to driven shaft speed.

Throttle pressure regulator valve and detent valve

A throttle pressure regulator valve and detent valve generally denoted at 65 is supplied with fluid by the drive line 59 and translates load and torque demand from the throttle position of engine throttle 66 and governor pressure in line 64 into a TV pressure in a TV line 67, which pressure increases with increasing throttle opening and decreasing speed and may be equal to drive line pressure at full throttle. Valve 65 also connects TV pressure to a detent line 68 when throttle 66 is through the detent position shown, the detent valve normally exhausting detent line 68 and blocking TV pressure at all lower throttle positions including the zero throttle position shown. Valve 65 may be of the type shown in Hause 3,108,493, entitled "Transmission."

Shift valve

A shift valve 72 controls the shift from low to high drive and comprises a shift valve element 74 having large lands *a* and *b* mounted in a valve body bore 76 and a small land *c* mounted in a bore 78, land *b* having a slightly larger diameter than land *a* to provide a hysteresis effect for holding the shift valve element in an upshift position. Governor line 64 is connected to the closed left end of bore 76 to deliver governor pressure to act on the end of land *a* to tend to upshift the valve against the downshift biasing force of a spring 80 bearing against the valve element and valve body and the downshift biasing forces of TV pressure and detent pressure as explained in detail later.

In the downshift position shown, shift valve element 74 connects a high servo apply line 82 serving the high servo 38 to an exhaust 84 and in the upshift position connects drive line 59 to the high servo apply line 82 and connected high servo 38 to engage the high clutch. The fluid supplied to the high servo also flows via a band release line 87 to the low servo release chamber 50 to equalize the pressure on piston 46 so that springs 54 can release the band 34.

A ball check valve 83 provided in the high servo 38 is held closed by high servo apply pressure. Valve 83 is opened by centrifugal force in neutral and reverse to exhaust fluid pressure in the low servo release chamber 50 and high servo 38 to an exhaust 85. Valve 83 may be of the type shown in Fischer 2,740,512 entitled "Hydraulic Clutch and Relief Valve Therefor."

The shift valve is held in the downshift position against the left end of bore 76 by the force of spring 80 and only TV pressure at and below the throttle detent position which TV pressure is connected by TV line 67 to act on the end of land *c*. When the proper relationship between speed and throttle opening exists, governor pressure acting on land *a* upshifts the shift valve to engage high drive and disengage low drive, land *b* bottoming on step 88 in the upshift position.

Detent line 68 is connected to shift valve element 74 between the lands *b* and *c*. When the shift valve element 74 is in the downshift position and detent pressure is made available by detent valve 65 to detent line 68 on passing through detent, this pressure wil act on the small additional area provided by the differential area between lands *b* and *c* of valve element 74, along with the forces resisting a normal upshift, to hold the transmission in low at higher speeds. After an upshift, with the throttle through detent or a normal upshift and the throttle is then passed through detent, the TV and detent pressure forces provide a force downshift if vehicle speed becomes or is low enough. The hysteresis effect of the shift valve prevents hunting by requiring a slightly lower downshift speed.

High speed timing, flow control valve

The high speed timing, flow control valve 90 controls the rate of low band apply in three steps in accordance with vehicle speed by controlling the connection between drive line 59 and a low servo apply line 91 connected to the low servo apply chamber 48. The flow control valve comprises an inner valve element or pin 92 reciprocally mounted in a spool valve element 93 which has equal diameter lands *a* and *b* mounted in a valve body bore 94. Pin 92 is limited in extent of movement relative to valve element 93 by axially spaced stop rings 95 and 96 retained on pin 92 and abuttable with the opposite ends of valve element 93.

The control or signal presure for operating the flow control valve is provided by governor pressure which is delivered by governor line 64 to act in the closed left end of bore 94 on the left end of the movable valve assembly. Governor pressure biases the valve assembly rightwardly against the leftward bias of a spring 97 positioned between valve element 93 and a pin 98 mounted in the valve body. Governor pressure, spring bias and the different pressure responsive areas of the movable valve assembly determine the three flow control valve positions to control the flow to the low servo substantially as shown in FIGURE 2 and as will now be described.

In a low governor pressure range, the flow control valve 90 is held in the fast flow rate position shown with spool valve element 93 being held against the left pin stop 95 by spring 97 to bottom pin 92 on the left end of the valve body. This positions valve element 93 to connect drive line 59 to the low apply line 91 between lands *a* and *b* for unrestricted flow past a passage which has a small orifice 99 connecting drive line 59 to line 91. Thus, fluid flow to the low servo apply chamber 48 is controlled only by the large orifice 100 in line 91, which large orifice is downstream of the smaller orifice 99 at the low servo and provides a fast flow rate in the low governor pressure range which flow rate is substantially constant and is generally indicated by the flat curve segment A–B shown in FIGURE 2. The intermediate flow rate position is determined by the pin 92 being moved by higher governor pressure in an intermediate governor pressure range to bottom on pin 98 while valve element 93 is held against the left stop ring 95 by spring 97 and moved to the right against the spring bias by the higher governor pressure so that diametrically opposed flats 101 on land *a* are positioned to restrict the connection between drive line 59 and low apply line 91 in bore 94. This flow restriction provides an orifice which acts in parallel with the small orifice 99 and in series with the large orifice 100 to control the flow rate to the low servo apply chamber 48 at a slower intermediate rate. The intermediate flow rate provided in the intermediate governor pressure range is substantially constant and is generally indicated by the flat curve segment C–D, the step B–C down to the lower flow rate occurring at the lowest intermediate governor pressure. For the slow flow rate position, the pin 92 remains bottomed on the pin 98 and the valve element 93 is moved still further to the right by still higher governor pressure in a high governor pressure range and against the right stop ring 96 to block the valve connection between drive line 59 and the low apply line 91 so that the low servo flow rate is controlled by the small orifice 99 and the larger downstream orifice 100. The low flow rate provided in the high governor pressure range is substantially constant as generally indicated by the flat curve segment E-F, the step D-E down to the lower flow rate occurring at the lowest high governor pressure.

If F is the spring force of spring 97 on valve element 93 and G is governor pressure, the valve 90 will be in the high flow rate position whenever G is less than $$F/A_1+A_2$$

where $A_1$ and $A_2$ are the pressure responsive areas of valve element 93 and pin 92, respectively. Valve 90 will be in the intermediate flow rate position when G is equal to or greater than $$F/A_1+A_2$$

but less than $F/A_1$. Whenever G is equal to $F/A_1$ or is greater, valve 90 will be held in the low flow rate position. Thus, the flow to the low servo is controlled in three steps to provide three different flow rates dependent upon governor pressure so that low band apply can be timed to high clutch release at three different rates dependent upon vehicle speed.

Operation

With the manual valve 58 in neutral and the throttle closed, the regulated fluid pressure in line 57 is blocked at the manual valve 58 and the drive line 59 and connected devices are exhausted.

When manual valve 58 is moved from neutral to drive position, the manual valve supplies main line pressure to the drive line 59 for delivery to the fluid to the throttle pressure and detent valve 65, the governor 62 and the shift valve 72 which is held in the downshift position. The drive line supplies fluid to the low servo apply chamber 48 via the flow control valve 90, which at low vehicle speeds including zero speed is in the high flow rate position with large orifice 100 controlling the flow rate. Thus, the low drive is engaged at a desirable fast rate and the vehicle can be accelerated.

With increasing part throttle opening, the throttle pressure regulator valve 65 regulates TV pressure in TV line 67 at proportionately increasing pressure which pressure is directed to act on land c of shift control valve element 74. The shift valve 72 is thus acted on by a downshift force equal to TV pressure multiplied by the area of land c of valve element 74 plus the bias of spring 80. When vehicle speed increases so that governor pressure acting on land a of shift valve element 74 overcomes the spring and TV pressure force, the shift valve moves to the upshift position to connect drive line 59 to the high clutch line 82 and low servo release line 87 to apply the high clutch and release the low brake to provide a part throttle upshift. TV pressure and spring 80 acting against governor pressure and the hysteresis effect of the shift valve provide the normal part throttle downshift.

Further movement of the throttle through the detent position causes the detent valve 65 to deliver TV pressure to detent line 68 to act on the differential area between lands b and c of shift valve element 74 to provide full throttle detent up and down, forced shifts at predetermined speeds, the hysteresis effect of the shift valve providing a slightly lower downshift speed to prevent shift valve hunting.

The general downshift characteristics of the transmission are shown in FIGURE 3 where the full torque capacities of the high clutch and low band brake at full engagement are equal. The high clutch release rate G is constant and the low band apply rate varies from a slow apply rate H with the low flow rate effected by flow control valve 90 to an intermedite apply rate I with the intermediate flow rate to a fast apply rate J with the high flow rate. Since the low band servo effective feed orifice is variable and the high clutch exhaust orifice at valve 83 is constant, the pressure or torque capacity overlap between the high clutch and low band decreases as the low servo effective feed orifice is made smaller.

In the upshift shift valve position and whenever the biasing forces thereon call for a downshift, the flow control valve element 93 will have been biased by governor pressure to establish the desired flow control metering area for connecting drive line 59 to the low servo. When the biasing forces acting on the shift valve in the upshift position call for the downshift in the low governor pressure range, the flow control valve 90 will have been positioned in the high flow rate position shown to determine the fast flow rate to apply the low band servo 42 at fast rate J and with the largest amount of torque capacity overlap K between high clutch release and low band apply. When governor pressure has increased to the intermediate governor pressure range the flow control valve 90 will be positioned in the intermediate flow rate position to determine the intermediate flow rate to apply the low band servo 42 at intermediate rate I. With the decreased flow rate to the low servo apply chamber 48, low band apply on the downshift is delayed slightly to time low band apply to high clutch release to provide a smaller overlap torque capacity L which gives a smoother downshift at the intermediate speeds. In the high governor pressure range, the flow control valve 90 will be positioned in the low flow rate position to determine the low flow rate to apply the low band servo at the slow rate H at these high vehicle speeds. With the still decreased flow rate to the low servo apply chamber 48, low band apply on the downshift is still further delayed to time low band apply to high clutch release to provide a still smaller torque capacity overlap M which gives a smoother downshift at the high speeds. Thus, low band apply is timed to high clutch release at three different rates over the entire governor pressure (vehicle speed) range to improve the downshifts through the entire speed range to provide better operator feel, particularly for the forced downshifts.

The invention may be modified within the scope of the appended claims.

I claim:

1. A flow control valve comprising an inlet passage; an outlet passage; a passage having a flow restriction connecting said inlet passage and said outlet passage; valve means providing a different flow rate establishing passage connecting said inlet passage and said outlet passage in each one of a plurality of valve positions and biasing means including speed responsive biasing means operatively connected to said valve means operable to hold said valve means in each said valve position throughout a predetermined and different speed range.

2. The flow control valve set forth in claim 1 and said valve means providing at least two flow rate establishing passages with one passage being a restricted flow passage and another passage being an unrestricted flow passage.

3. The flow control valve set forth in claim 1 and said valve means having a blocking position for blocking flow through the valve and said biasing means including said speed responsive biasing means being operable to hold said valve means in said blocking position above a predetermined speed.

4. The flow control valve set forth in claim 1 and said speed responsive biasing means being operable to increasingly bias said valve means to a lower flow rate position with increasing speed.

5. A flow control valve comprising an inlet passage; an outlet passage; a movable valve assembly for establishing and controlling a connection between said passages comprising a first valve element having a pair of first stops and a second valve element mounted on said first valve element for movement between said first stops; a pair of second stops for limiting the movement of said first valve element; a spring for urging said second valve element against one of said first stops and said first valve element against one of said second stops to determine a first valve position in which said second valve element provides an unrestricted passage connecting said passages and speed responsive means operatively connected to both said valve elements for increasingly biasing said valve assembly in opposition to said spring with increasing speed so that said valve assembly is positioned in said first valve position in a low speed range and is moved in an intermediate speed range to abut said first valve element with the other of said second stops while said spring prevents relative movement between said valve elements to determine a second valve position in which said second valve element provides a restricted passage connecting said passages and is moved in a high speed range to abut said second valve element with the other of said first stops to determine a third valve position in which said second valve element blocks said outlet passage from said inlet passage.

6. The flow control valve set forth in claim 5 and said first valve element being a pin, said second valve element being a spool valve element and said spool valve element having a land provided with a flat for determining said restricted passage.

7. The flow control valve set forth in claim 5 and a passage having a flow restriction connecting said inlet passage and said outlet passage.

8. In a transmission control system for controlling the shift between different ratio drives; shift timing means operable to time the establishment of one drive on disestablishment of another drive; speed responsive means operatively connected to said shift timing means for varying the time rates in relation to speed and said shift timing means having means for providing a different time rate in at least three different speed ranges for establishing said one drive with a torque capacity overlap between drives which decreases with increasing speed.

9. In a transmission control system; shift control means for controlling shifting between different ratio drives; shift timing means having a plurality of positions determining different time rates for effecting establishing of one drive on disestablishment of another drive; speed responsive means operatively connected to said shaft timing means for increasingly biasing said shaft timing means to positions of slower time rates with increasing speed and said shaft timing means including control means for maintaining each position throughout a predetermined and different speed range.

10. In a transmission; a multi-ratio drive unit having ratio establishing means for establishing a low and a high ratio drive; shaft control means operatively connected to said ratio establishing means having a low ratio position for establishing said low ratio drive and a high ratio position for establishing said high ratio drive; timing control means operatively connected to said ratio establishing means having a fast timing position for timing the establishment of one of said drives at a fast rate, an intermediate timing position for timing the establishment of said one drive at an intermediate rate and a slow timing position for timing the establishment of said one drive at a slow rate; torque demand means operatively connected to said shift control means for increasingly biasing said shift control means to said low ratio position with increasing torque demand and speed responsive means operatively connected to said shift control means and said timing control means for increasingly biasing said shift control means to said high ratio position with increasing speed and for increasingly biasing said timing control means from said fast timing position to said intermediate timing position and from said intermediate timing position to said slow timing position with increasing speed.

11. In a transmission; a multi-ratio drive unit having fluid actuated ratio establishing means for establishing a low and a high ratio drive; a source of fluid at a regulated pressure; passage means including flow control valve means operatively connecting said source and said ratio establishing means for determining the apply rate of said low ratio drive; shift valve means operatively connected to said source and said ratio establishing means having a low ratio position for establishing said low ratio drive and a high ratio position for establishing said high ratio drive; torque demand means operatively connected to said source and said shift valve means providing a torque demand pressure for increasingly biasing said shift valve means to said low ratio position with increasing torque demand; said flow control valve means providing an effective fast flow rate passage in a fast timing position for timing low ratio drive establishment at a fast rate, an effective intermediate flow rate passage in an intermediate timing position for timing low ratio drive establishment at an intermediate rate and an effective slow flow rate passage in a slow timing position for timing low ratio drive establishment at a slow rate and speed responsive means operatively connected to said source, said shift valve means and said flow control valve means providing a governor pressure to increasingly bias said shift valve means to said high ratio position with increasing speed and to increasingly bias said flow control valve means from said fast timing position to said intermediate timing position and then to said slow timing position with increasing speed.

12. The transmission set forth in claim 11 and said flow control valve means comprising a movable valve assembly having a pair of relatively movable valve elements connected to said governor pressure with one of said valve elements having means for determining said effective flow rate passages; a spring operatively connected to said valve elements for biasing said valve elements in opposition to said governor pressure; said valve elements having governor pressure responsive areas determined in relation to each other and the spring force so that said flow control valve means is held in said fast timing position when the governor pressure force on both said valve elements is less than the spring force, is held in said intermediate timing position when the governor pressure force on both said valve elements to equal to or greater than the spring force and is held in said slow timing position whenever the governor pressure force on said one valve element is equal to or greater than the spring force.

13. In a transmission control system for controlling the shaft between different ratio drives; shift timing means having at least three positions determining at least three different time rates for effecting establishment of one drive on disestablishment of another drive; speed responsive means operatively connected to said shift timing means for increasingly biasing said shift timing means to positions of slower time rates with increasing speed and said shift timing means including control means for maintaining each position throughout a predetermined and different speed range.

References Cited

UNITED STATES PATENTS

| | | | |
|---|---|---|---|
| 2,157,472 | 5/1939 | Bellis | 137—54 X |
| 2,713,800 | 7/1955 | Forster | 74—857 |
| 2,769,350 | 11/1956 | Lucia et al. | 74—869 |
| 3,053,116 | 9/1962 | Christenson et al. | 74—868 |
| 3,180,173 | 4/1965 | Fischer et al. | 74—868 |

DONLEY J. STOCKING, *Primary Examiner.*

ARTHUR T. McKEON, *Examiner.*

UNITED STATES PATENT OFFICE
CERTIFICATE OF CORRECTION

Patent No. 3,383,956                                    May 21, 1968

Howard E. Chana

It is certified that error appears in the above identified patent and that said Letters Patent are hereby corrected as shown below:

Column 3, line 75, "wil" should read -- will --. Column 4, line 25, "presure" should read -- pressure --. Column 7, line 36, "establishing" should read -- establishment --; lines 38, 39, 41 and 46, "shaft", each occurrence, should read -- shift --. Column 8, line 6, "ra io" should read -- ratio --; line 42, "to" should read -- is --; line 47, "shaft" should read -- shift --.

Signed and sealed this 4th day of November 1969.

(SEAL)
Attest:

Edward M. Fletcher, Jr.
Attesting Officer

WILLIAM E. SCHUYLER, JR.
Commissioner of Patents